United States Patent
Hawkins

(10) Patent No.: US 6,439,416 B1
(45) Date of Patent: Aug. 27, 2002

(54) THERMOS DEVICE

(76) Inventor: George E. Hawkins, 4018 Pinnacle Way, Hephzibah, GA (US) 30815

( * ) Notice: Subject to any disclaimer, the term of this patent is extended or adjusted under 35 U.S.C. 154(b) by 0 days.

(21) Appl. No.: 09/865,310

(22) Filed: May 25, 2001

(51) Int. Cl.⁷ .............................................. A65D 51/24
(52) U.S. Cl. .......................... 220/524; 220/735; 215/6
(58) Field of Search ................. 220/735, 504, 220/524, 602; 215/6, 395

(56) References Cited

U.S. PATENT DOCUMENTS

| | | | |
|---|---|---|---|
| 3,465,905 A | | 9/1969 | Schottanes |
| 3,908,887 A | * | 9/1975 | Leto ........................ 220/735 |
| 4,444,324 A | | 4/1984 | Grenell |
| 5,086,926 A | | 2/1992 | Paige et al. |
| 5,197,623 A | * | 3/1993 | Wang ....................... 220/735 |
| 5,335,809 A | | 8/1994 | Toida et al. |
| D363,858 S | | 11/1995 | Sweene |
| 5,499,738 A | | 3/1996 | Burleigh |
| 6,003,710 A | * | 12/1999 | Huang ...................... 220/735 |

* cited by examiner

*Primary Examiner*—Joseph M. Moy

(57) ABSTRACT

A thermos device for holding two insulated food or drink products. The thermos device includes a generally tubular body having a first end, a second end and a peripheral wall extending between the first and second ends. Each of the first and second ends has an opening extending therein. Each of a pair of annular lips is integrally coupled to and extends away from an edge of each of the openings. Each of the lips has a threaded external surface. An intermediate wall is positioned between the first and second ends such that a pair of compartments is defined. Each of a pair of covers selectively closes the openings in the tubular body. Each of the covers is adapted for threadably engaging one of the lips. A first cup is positionable over a first of the covers and frictionally engages the first cover. A second cup is positionable over a second of the covers. The second cup has a diameter generally equal to a diameter of the tubular body and is adapted for frictionally engaging the peripheral wall.

5 Claims, 3 Drawing Sheets

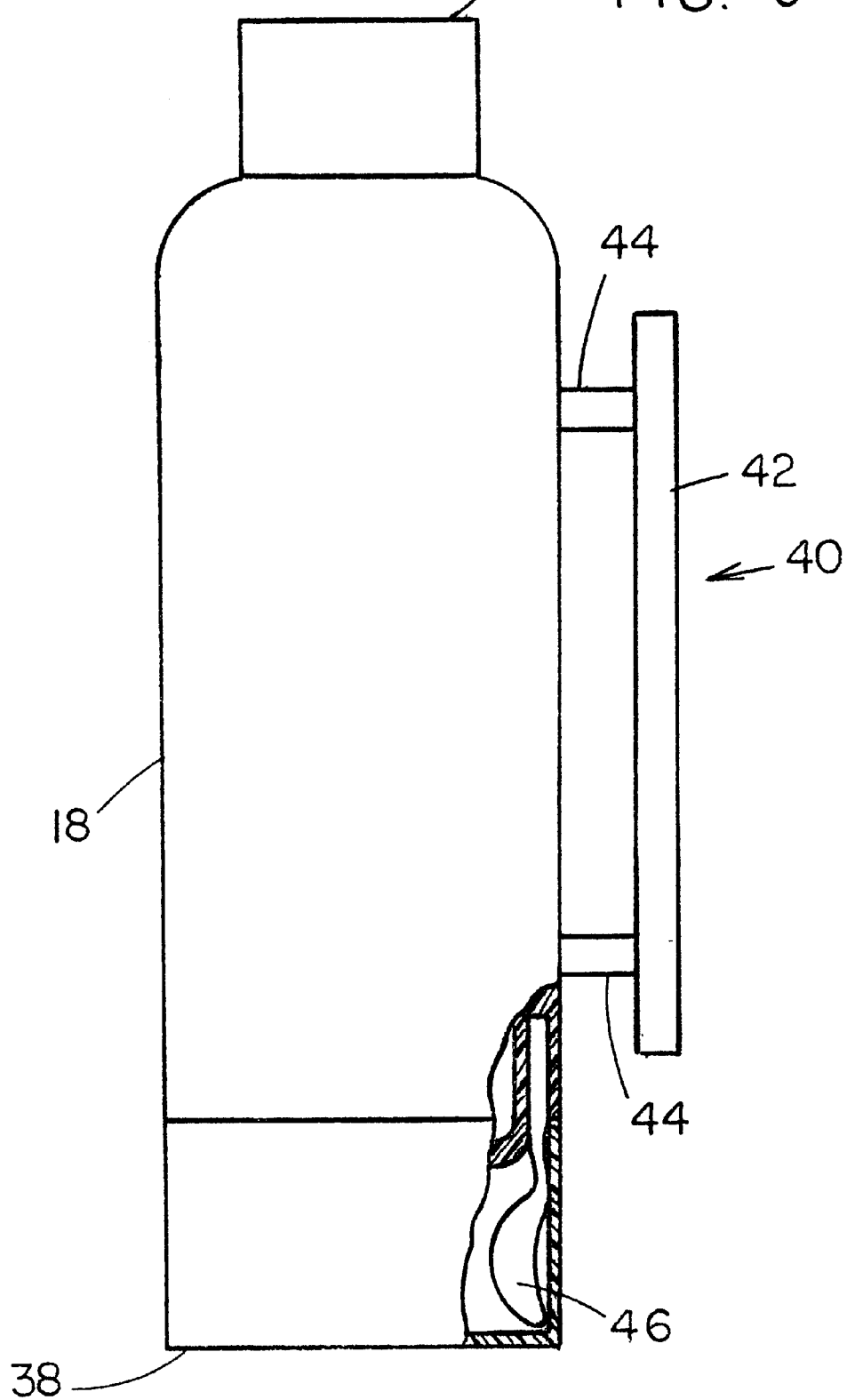

THERMOS DEVICE

BACKGROUND OF THE INVENTION

1. Field of the Invention

The present invention relates to thermos devices and more particularly pertains to a new thermos device for holding two insulated food or drink products.

2. Description of the Prior Art

The use of thermos devices is known in the prior art. More specifically, thermos devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,499,738; U.S. Pat. No. 5,335,809; U.S. Pat. No. 5,086,926; U.S. Pat. No. 3,465,905; U.S. Pat. No. 4,444,324; and U.S. Des. Patent No. 363,858.

While these devices fulfill their respective, particular objectives and requirements, the aforementioned patents do not disclose a new thermos device. The inventive device includes a generally tubular body having a first end, a second end and a peripheral wall extending between the first and second ends. Each of the first and second ends has an opening extending therein. Each of a pair of annular lips is integrally coupled to and extends away from an edge of each of the openings. Each of the lips has a threaded external surface. An intermediate wall is positioned between the first and second ends such that a pair of compartments is defined. Each of a pair of covers selectively closes the openings in the tubular body. Each of the covers is adapted for threadably engaging one of the lips. A first cup is positionable over a first of the covers and frictionally engages the first cover. A second cup is positionable over a second of the covers. The second cup has a diameter generally equal to a diameter of the tubular body and is adapted for frictionally engaging the peripheral wall.

In these respects, the thermos device according to the present invention substantially departs from the conventional concepts and designs of the prior art, and in so doing provides an apparatus primarily developed for the purpose of holding two insulated food or drink products.

SUMMARY OF THE INVENTION

In view of the foregoing disadvantages inherent in the known types of thermos devices now present in the prior art, the present invention provides a new thermos device construction wherein the same can be utilized for holding two insulated food or drink products.

The general purpose of the present invention, which will be described subsequently in greater detail, is to provide a new thermos device apparatus and method which has many of the advantages of the thermos devices mentioned heretofore and many novel features that result in a new thermos device which is not anticipated, rendered obvious, suggested, or even implied by any of the prior art thermos devices, either alone or in any combination thereof.

To attain this, the present invention generally comprises a generally tubular body having a first end, a second end and a peripheral wall extending between the first and second ends. Each of the first and second ends has an opening extending therein. Each of a pair of annular lips is integrally coupled to and extends away from an edge of each of the openings. Each of the lips has a threaded external surface. An intermediate wall is positioned between the first and second ends such that a pair of compartments is defined. Each of a pair of covers selectively closes the openings in the tubular body. Each of the covers is adapted for threadably engaging one of the lips. A first cup is positionable over a first of the covers and frictionally engages the first cover. A second cup is positionable over a second of the covers. The second cup has a diameter generally equal to a diameter of the tubular body and is adapted for frictionally engaging the peripheral wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new thermos device apparatus and method which has many of the advantages of the thermos devices mentioned heretofore and many novel features that result in a new thermos device which is not anticipated, rendered obvious, suggested, or even implied by any of the prior art thermos devices, either alone or in any combination thereof.

It is another object of the present invention to provide a new thermos device which may be easily and efficiently manufactured and marketed.

It is a further object of the present invention to provide a new thermos device which is of a durable and reliable construction.

An even further object of the present invention is to provide a new thermos device which is susceptible of a low cost of manufacture with regard to both materials and labor, and which accordingly is then susceptible of low prices of sale to the consuming public, thereby making such thermos device economically available to the buying public.

Still yet another object of the present invention is to provide a new thermos device which provides in the apparatuses and methods of the prior art some of the advantages thereof, while simultaneously overcoming some of the disadvantages normally associated therewith.

Still another object of the present invention is to provide a new thermos device for holding two insulated food or drink products.

Yet another object of the present invention is to provide a new thermos device which includes a generally tubular body having a first end, a second end and a peripheral wall extending between the first and second ends. Each of the first and second ends has an opening extending therein. Each of a pair of annular lips is integrally coupled to and extends away from an edge of each of the openings. Each of the lips has a threaded external surface. An intermediate wall is positioned between the first and second ends such that a pair of compartments is defined. Each of a pair of covers selectively closes the openings in the tubular body. Each of the covers is adapted for threadably engaging one of the lips. A first cup is positionable over a first of the covers and frictionally engages the first cover. A second cup is positionable over a second of the covers. The second cup has a diameter generally equal to a diameter of the tubular body and is adapted for frictionally engaging the peripheral wall.

Still yet another object of the present invention is to provide a new thermos device that has space therein for holding utensils.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side broken view of the present invention.

DESCRIPTION OF THE PREFERRED EMBODIMENT

Figure 1:
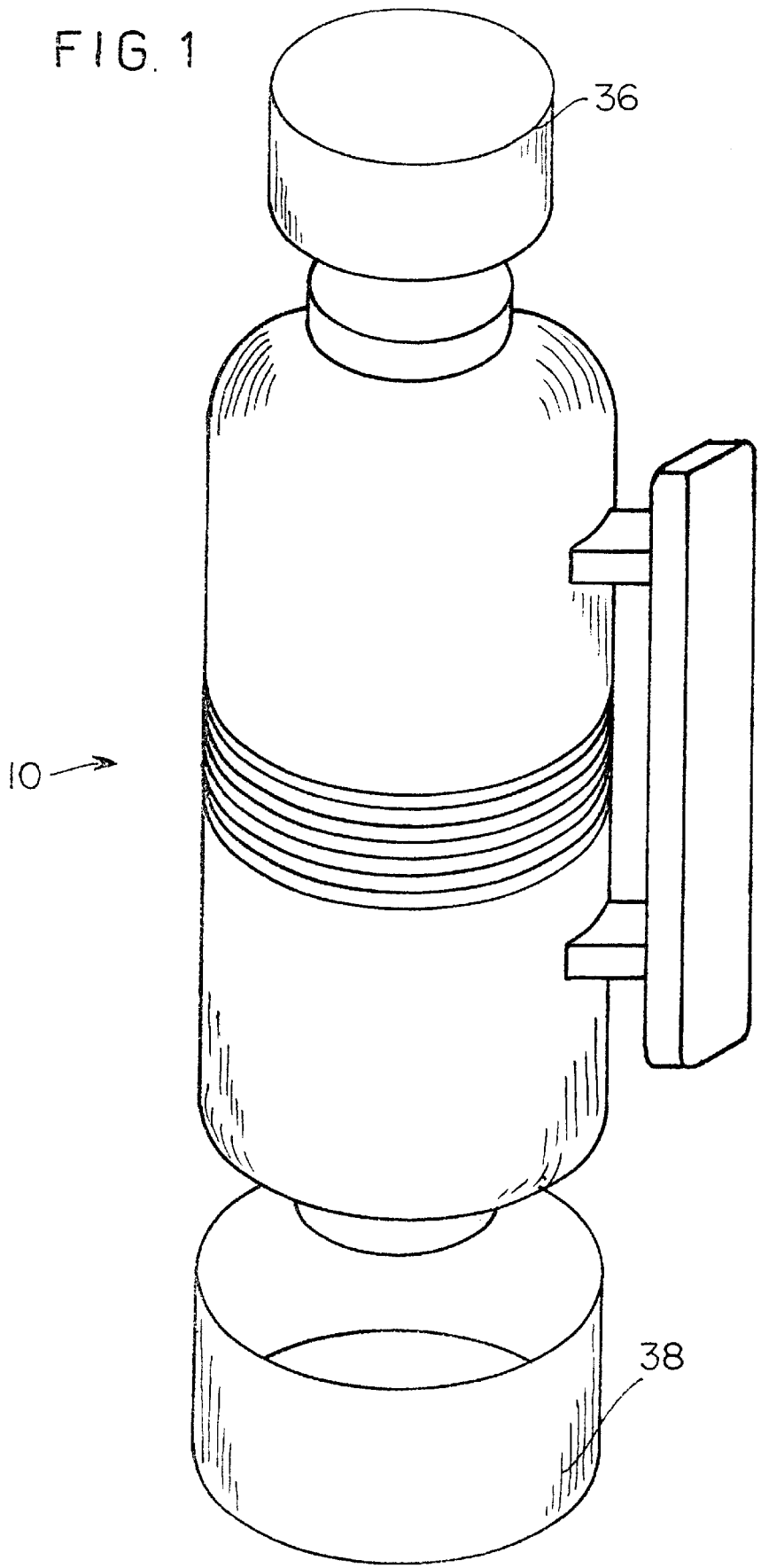
FIG. 1 is a schematic perspective view of a new thermos device according to the present invention.
Figure 2:
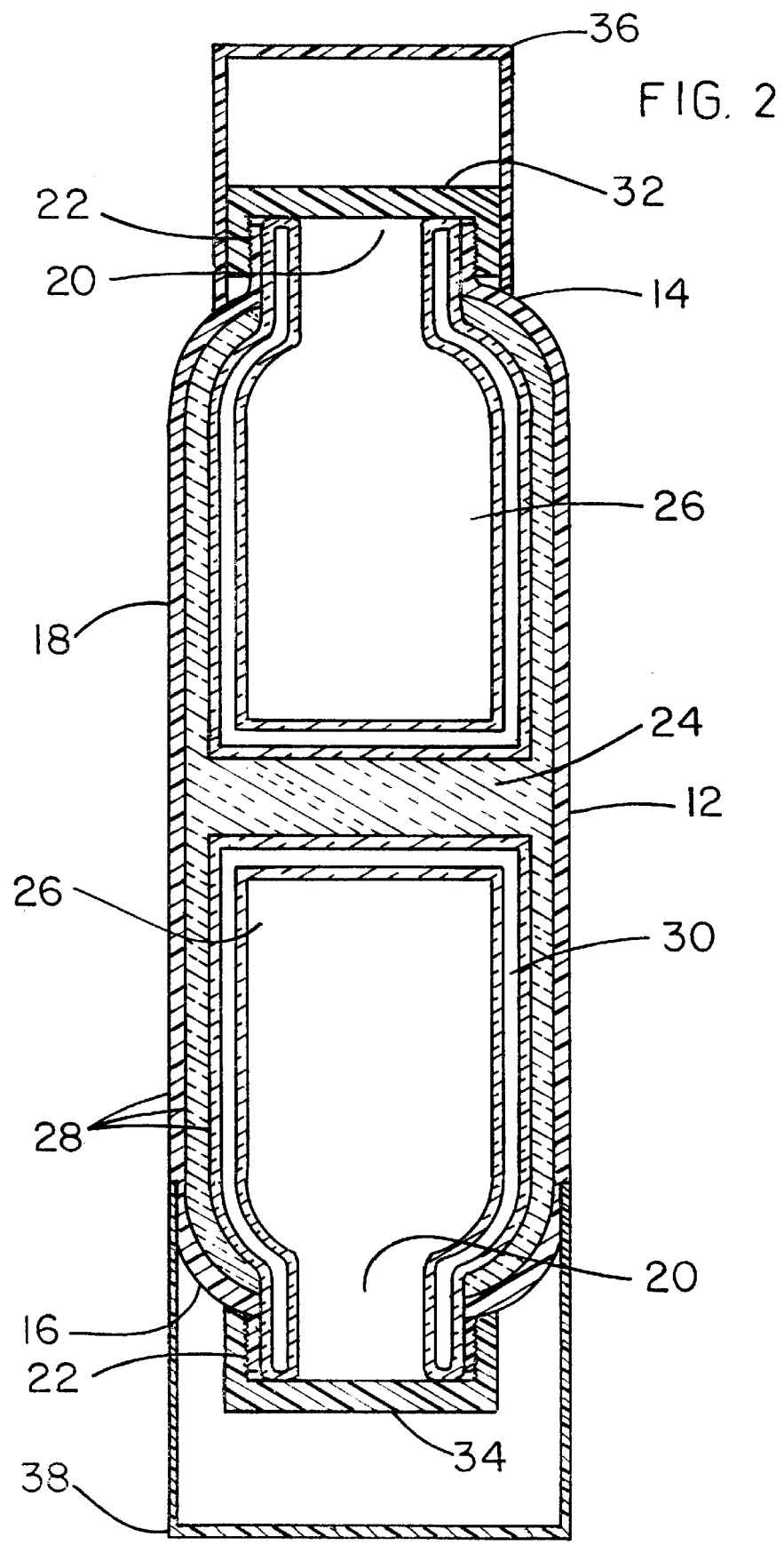
FIG. 2 is a schematic cross-sectional view of the present invention.

With reference now to the drawings, and in particular to FIGS. 1 through 3 thereof, a new thermos device embodying the principles and concepts of the present invention and generally designated by the reference numeral 10 will be described.

As best illustrated in FIGS. 1 through 3, the thermos device 10 generally comprises a generally tubular body 12 having a first end 14, a second end 16 and a peripheral wall 18 extending between the first 14 and second 16 ends. Each of has first 14 and second 16 ends taper inward. Each of has first 14 and second 16 ends has an opening 20 extending therein. Each of a pair of annular lips 22 is integrally coupled to and extends away from an edge of each of the openings 20. Each of the lips 22 has a threaded external surface. An intermediate wall 24 is positioned between the first 14 and second 16 ends such that a pair of compartments 26 is defined. The peripheral wall 18 and intermediate wall 24 comprises a plurality of layers 28 of different materials securely coupled together. The different layers create an insulated effect. Ideally a vacuum layer 30 is positioned between the layers.

A pair of covers 32, 34 selectively close the openings 20 in the tubular body 12. Each of the covers 32, 34 is adapted for threadably engaging one of the lips 22.

A first cup 36 is positionable over a first 32 of the covers. The first cup 36 frictionally engages the first cover 32. A second cup 38 is positionable over a second 34 of the covers. The second cup 38 has a diameter generally equal to a diameter of the tubular body 12. The second cup 38 is adapted for frictionally engaging the peripheral wall 18.

A handle 40 includes an elongated member 42. Each of a pair of arms 44 is securely attached to and extends away from the elongated member 42 in a generally parallel direction. Each of the arms 44 has a free end securely attached to the peripheral wall 18.

A plurality of utensils 44 is positionable between the second cup 38 and the second end 18 of the tubular body 12.

In use, the compartments 26 are used as compartments in a traditional thermos. The second cup 38 engages the peripheral wall 18 which leaves space between the second cover 38 and the second cup 34. The utensils 44 may be positioned in the space. The cups 36, 38 may be used for drinking liquids.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An insulated dual container device comprising:
   a generally tubular body having a first end, a second end and a peripheral wall extending between said first and second ends, each of said first and second ends having an opening extending therein, a pair of annular lips being integrally coupled to and extending away from an edge of each of said openings, each of said lips having an threaded external surface, an intermediate wall being positioned between said first and second ends such that a pair of compartments is defined;
   a pair of covers for selectively closing said openings in said tubular body, each of said covers being adapted for threadably engaging one of said lips;
   a first cup being positionable over a first of said covers, said first cup frictionally engaging a side wall of said first cover;

a second cup being positionable over a second of said covers, said second cup having a diameter generally equal to a diameter of said tubular body, said second cup being adapted for frictionally engaging said peripheral wall and;

a handle, said handle including an elongated member, a pair of arms being securely attached to and extending away from said elongated member in a generally parallel direction, each of said arms having a free end securely attached to said peripheral wall.

2. The insulated dual container device as in claim 1, wherein said peripheral wall comprises a plurality of layers of different materials securely coupled together.

3. The insulated dual container device as in claim 1, further including:

a plurality of utensils being positionable between said second cup and said second end of said tubular body.

4. The insulated dual container device as in claim 1, further including:

a spoon, said spoon being positionable between said second cup and said second end of said tubular body.

5. An insulated dual container device comprising:

a generally tubular body having a first end, a second end and a peripheral wall extending between said first and second ends, each of said first and second ends tapering inward, each of said first and second ends having an opening extending therein, a pair of annular lips being integrally coupled to and extending away from an edge of each of said openings, each of said lips having an threaded external surface, an intermediate wall being positioned between said first and second ends such that a pair of compartments is defined, said peripheral wall comprising a plurality of layers of different materials securely coupled together;

a pair of covers for selectively closing said openings in said tubular body, each of said covers being adapted for threadably engaging one of said lips;

a first cup being positionable over a first of said covers, said first cup frictionally engaging a side wall of said first cover;

a second cup being positionable over a second of said covers, said second cup having a diameter generally equal to a diameter of said tubular body, said second cup being adapted for frictionally engaging said peripheral wall;

a handle including an elongated member, a pair of arms being securely attached to and extending away from said elongated member in a generally parallel directions each of said arms having a free end securely attached to said peripheral wall; and a plurality of utensils being positionable between said second cup and said second end of said tubular body.

\* \* \* \* \*